Feb. 27, 1962　　　H. D. EPSTEIN　　　3,023,287
THERMOSTATIC DEVICE
Filed March 16, 1959　　　　　　　　　3 Sheets-Sheet 2
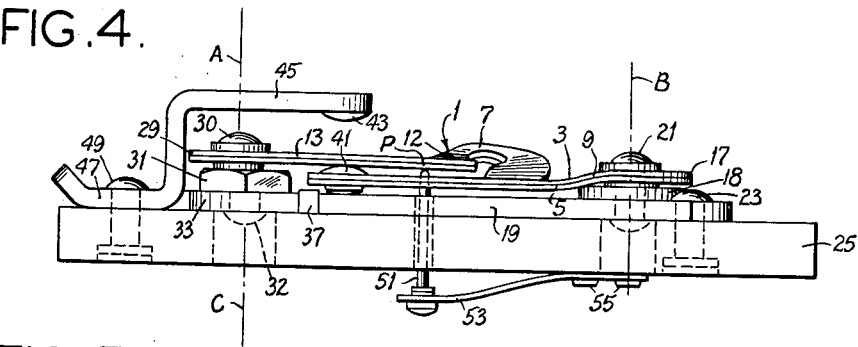
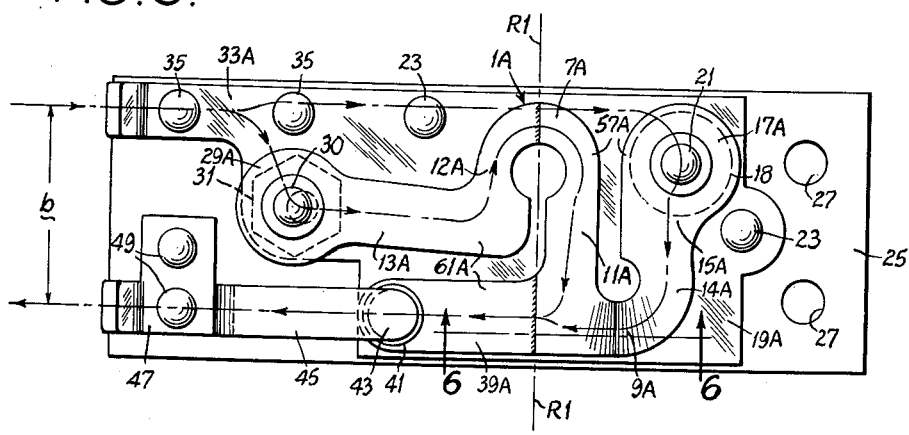
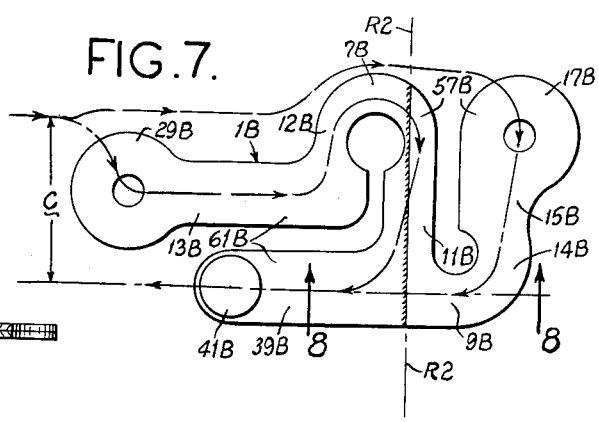
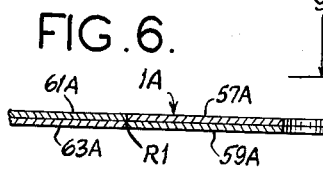
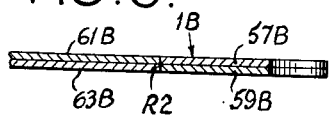
Henry David Epstein,
　　　Inventor.
Koenig and Pope,
　　　Attorneys.

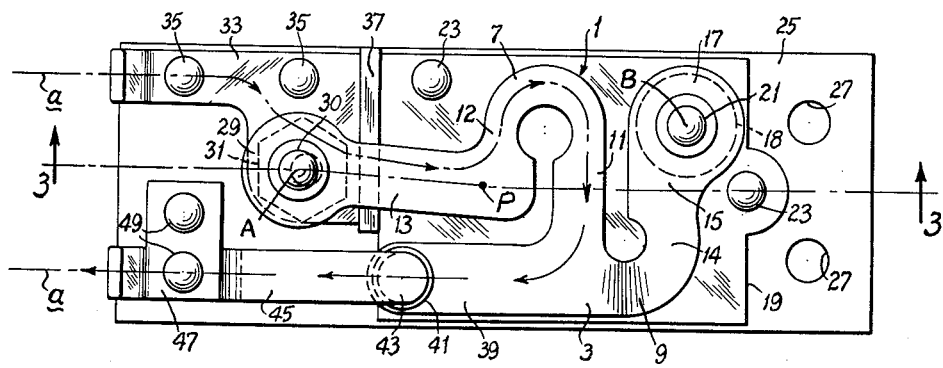

Feb. 27, 1962 H. D. EPSTEIN 3,023,287
THERMOSTATIC DEVICE
Filed March 16, 1959 3 Sheets-Sheet 3
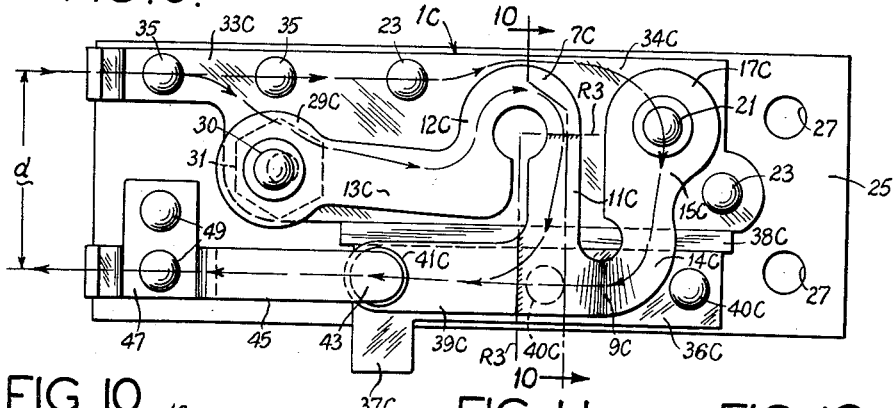
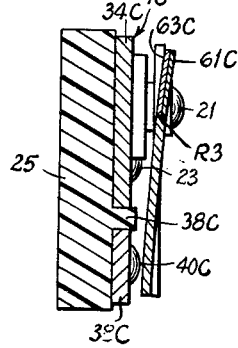
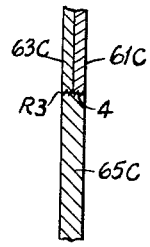
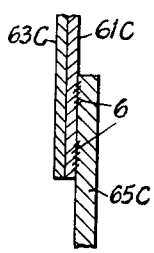
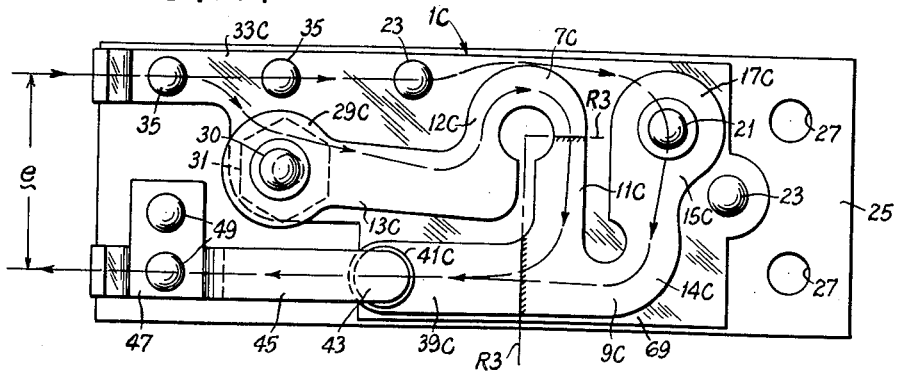

United States Patent Office 3,023,287
Patented Feb. 27, 1962

3,023,287
THERMOSTATIC DEVICE
Henry David Epstein, Cambridge, Mass., assignor to Texas Instruments Incorporated, Dallas, Tex., a corporation of Delaware
Filed Mar. 16, 1959, Ser. No. 799,514
6 Claims. (Cl. 200—113)

This invention relates to thermostatic devices, and with regard to certain more specific featuress, to such devices useful as snap-acting thermostatic operating means for switches and the like, being an improvement upon the devices shown in United States Patent 2,630,504.

Among the several objects of the invention may be noted the provision of a snap-acting thermostatic element which in appropriate form (as will appear) is spontaneously operative to snap in response to current-induced temperature changes, or in response to temperature changes induced by its ambient atmosphere, or in response to applied pressure for manual operation, or any two or more of these; and the provision of a device of the class described which in compact form is adapted readily to be designed in various forms to meet a variety of particular operating requirements. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a plan view illustrating a first form of the invention;

FIG. 2 is a front elevation of FIG. 1;

FIG. 3 is a cross section taken on line 3—3 of FIG. 1;

FIG. 4 is a view similar to FIG. 2 showing different positions of certain parts;

FIG. 5 is a plan view of a second form of the invention;

FIG. 6 is an enlarged fragmentary detail cross section, taken on line 6—6 of FIG. 5;

FIG. 7 is a plan view of an alternative form of thermostatic blade element like that shown in FIG. 5 and illustrating a third form of the invention;

FIG. 8 is an enlarged fragmentary detail cross section taken on line 8—8 of FIG. 7;

FIG. 9 is a plan view of a fourth modified form of the invention;

FIG. 10 is a detail cross section taken on line 10—10 of FIG. 9;

FIG. 11 is an enlarged detail of a junction portion between parts shown in FIG. 10;

FIG. 12 is a view similar to FIG. 11, showing an alternative form of junction; and, FIG. 13 is a view similar to FIG. 9, showing a fifth form of the invention.

Corresponding reference characters indicate corresponding parts throughout the several views of the drawings.

Referring now more particularly to the first form of the invention shown in FIGS. 1–4, there is shown in general at numeral 1 a current-conductive flexible thermostatic plate formed from a thin sheet of composite thermostatic material composed of a relatively low-expansion material such as Invar, bonded to a relatively high-expansion material such as an alloy consisting of 22% nickel, 3% chromium and the remainder iron. While this composite material is an example of one that may be used, it is to be understood that other known bonded combinations of relatively low- and high-expansion materials may be employed. In the example shown in FIGS. 1–4, the low-expansion Invar component is shown on top, as indicated at numeral 3, and the high-expansion alloy component is on the bottom, as shown at numeral 5. The composite plate 1, prior to mounting as shown in the darwings, is substantially flat in its normally unstressed condition. It assumes the warped condition illustrated in FIG. 2 because of the way in which it is mounted, as will appear. In this condition it is stressed.

The plate 1 is shaped essentially to provide an S-shape (appearing from the top in reverse), having a first loop 7 and an opposed second loop 9 joined by a common intermediate leg or join 11. An endwise first terminal leg 12 extending from the loop 7 is provided at an angle with an extension or support arm 13. An endwise second terminal leg 14 extending from the loop 9 is provided with an end part 15. The part 15 forms an eye 17 located by means of a rivet 21 on a support 18 carried upon a supporting plate 19. The plate 19 is held by rivets 23 on an insulating base 25. The base 25 is provided with suitable openings 27 by which it may be fastened to a suitable support such as in a switch casing (not shown).

The plate extension or arm 13 is also provided with a conductive eye 29 which is held eccentrically by means of a conductive rivet 30 on a conductive hexagonal support 31. The support 31 is riveted at 32 on a conductive supporting plate 33, the latter being fastened to the insulating plate 19 by means of rivets 35. The plate 33 is insulated from the plate 19 by an insulating ridge 37 and forms one line terminal for the connection to one side of an electric circuit.

Extending from the junction between the loop 9 and common leg 11 is a contact arm 39 which at its end carries a movable contact 41 engageable and disengageable with respect to a fixed contact 43. Arm 39 extends in the general direction of arm 13. The fixed contact 43 is attached under a conductive arm 45 of a separate second line terminal 47 attached to the insulating plate 25 by means of rivets 49. Contact 43 is located above plate 1.

The supports 18 and 31 are arranged such that the plane of the eye 17 is at a slightly lower elevation than the plane of the eye 29. The center lines A and B of rivets 30 and 21 are positioned during assembly of the plate 1 such that the plate 1 is tensioned in a direction generally along its plane which, in view of the relative elevations of eyes 29 and 17. This, at normal temperature warps the plate into the position shown in FIGS. 1–3, wherein contact 41 is moved up against contact 43. In this condition loop 7 is depressed and loop 9 is raised relative to a neutral plane in the arm or join 11. Adjustments of the distance between center lines A and B may be effected by so heading rivets 21 and 30 to the eyes 17 and 29, respectively, that some adjusting movement will be accommodated. Then the hexagonal support 31 may be turned and rotated on rivet 32 before the latter is headed on plate 19. When the proper tension is obtained in the plate 1 to stress it and to warp it into contact-closing position according to a desired calibration, the rivet 32 may be headed thereafter to hold center line A in fixed plate-stressing position with respect to center line B. It will be understood that the center line C of the rivet 32 is offset with respect to the center line A of the rivet 30, in order to provide the eccentricity required for adjustment. Other means may of course be employed for adjusting center lines A and B for plate-warping and tensioning purposes.

Thus from FIGS. 2 and 3 it will be apparent that the tensioned condition of the plate 1, and the depressed location of its eye 17 with respect to eye 29, result in the first loop 7 being depressed and the second loop 9 raised, which results in the arm 39 being moved upward into closed position of the contacts 41 and 43. Under normal temperature conditions the closing force between the contacts 41 and 43 depends upon the calibrated adjustment.

If the current flowing between terminals 33 and 47 via parts 13, 7, 11, 39, 41, 43 and 45 (see broken line $a$), is insufficient to heat the parts through which it flows to produce effective temperature rise therein, the loop will not move substantially from its depressed position shown in FIGS. 2 and 3 and the switch will remain closed. Upon excessive or overload current sufficient to cause enough heating to produce such an effective temperature rise, particularly in the arm 13, loop 7 will be raised by upward warping of arm 13 from the position shown in FIGS. 2 and 3 to that shown in FIG. 4, thereby causing the arm 39 to depress with snap action, thus opening the switch. During this action the original bowed condition of the loop 7 is also reversed (compare FIGS. 2 and 4). At this time the temperature of loop 9 will be lower, since it does not carry current and receives only a small amount of heat by conduction. It therefore is forced down into a depressed position consistent with the depressed position of arm 39 (FIG. 4). The excessive current will also heat the parts 11 and 39. In that event the heating in arm 11 will assist the opening action while that in arm 39 will somewhat offset it, but these effects are small.

That component of the composite sheet forming a current path which has the greatest specific electrical resistance will produce the greatest amount of heat and temperature rise. The smaller the cross section presented to current flow, the greater will be its resistivity and heating effect. Thus the narrower and thinner a component is at a given section carrying current and the higher its specific electrical resistance, the greater will be its heating effect. These characteristics may be taken advantage of in selecting the materials and their dimensions for constructing the plate 1 as a whole.

It will be understood that by appropriate preliminary stressing of plate 1 and the respective elevations of the contact 43 and the mounting supports 18 and 31 the device may be made to snap to open contact position and to remain so upon temperature drop, requiring manual reclosure. In any event, reclosure can be accomplished by effecting pressure at a point such as P from above the arm 13 as by a plunger in conventional fashion. Manual opening may be caused by pressing on a plunger 51 supported on a light return spring 53 which is riveted to the base 25 at 55. Thus the device may be made to be of the manual, or temperature reset variety.

This form of the invention is not operative in response to ambient heating from the surrounding atmosphere, since such heating affects both loops 7 and 9 in the same manner with regard to temperature rise, and the resulting forces affecting contacts 41 and 43 tend to offset one another. This form of the device therefore responds to current-induced temperature change, substantially independently of normal ambient temperature changes.

Summarizing as to the FIGS. 1–4 form, it will be seen that tensile stressing of the plate 1 between lines A and B deforms it and makes it snap acting. The offset of the plane of the anchor eye 17 in the direction of the high-coefficient component 5 determines the corresponding offset positions that loops 7 and 9 will assume, and consequently the opposite offset position that arm 39 will take in the cold position. Upon heating in response to excessive current, the offset positions of the loops 7, 9 and arm 39 are reversed with snap action at a critical temperature as determined by calibration carried out by adjusting nut 31. The calibrating adjustment for tensioning the plate to a substantial extent determines the force with which the contacts 41 and 43 tend to engage. The amount of this force which must be overcome upon thermostatic action determines the opening calibration and its existence is advantageous in offsetting any tendency to accidental opening movements of contact 41 under conditions of vibration or the like. It also minimizes creep-opening action prior to snapping. Creep action is defined as a preliminary small amount of contact movement that occurs in response to heating prior to snap action. It should be minimized so as to minimize any arcing tendency such as sometimes attends creep movements.

Another form of the invention is shown in FIGS. 5 and 6, in which many parts are the same as those above described and in such cases are provided with like numerals. Exceptions are that the metallic plate 19 and the line terminal 33 are made integral without the use of any insulating ridge therebetween, such as ridge 37 in the FIGS. 1–4 form. These integrated portions have therefore been lettered 19A and 33A and are conductive. Another exception is in the composite character of the thermostatic plate, which has been indexed 1A. The outline components of plate 1A have been lettered with the same numbers as the components of plate 1, except that the letter A has been added to each number.

As shown in FIG. 5, the shape of plate 1A is the same as that of plate 1 above described, and it is likewise mounted. However, the composite sheet of which it is formed has a reversal in position of the high- and low-expansion components on opposite sides of an abutment line indicated at $R_1$. This is best illustrated in FIG. 6. To the right of line $R_1$ the high-expansion component is lettered 57A and is uppermost. The low-expansion component is lettered 59A, being lowermost. To the left of line $R_1$ the low-expansion component is lettered 61A and is uppermost, and the high-expansion component is lettered 63A, being lowermost. The components are bonded face to face and along the line $R_1$ according to usual metallic bonding techniques. As shown by broken lines $b$, current which passes through the line terminal 33A divides, a portion of it flowing through the portions 29A, 13A, 7A, 11A and 39A via arm 45 to the line terminal 47. A portion also flows through the parts 17A, 15A, 9A and 39A of plate 1A, and over contacts 41, 43 to arm 45 and terminal 47. Thus loops 7A and 9A are parallel-connected between the line terminal parts 33A and 47. The result is that the parts of the plate 1A to the left of line $R_1$ which have their high-expansion components down, function in response to excess-current heating to elevate the loop, as in the case of the FIGS. 1–4 form. Also, the portions of the plate 1A to the right of the loop 7A and leg 11A in response to excess-current heating tend to bow in the opposite direction, thereby tending to accentuate downward opening movement of contact 41.

The FIGS. 5 and 6 form of the invention is also operative in response to ambient over-heating from the surrounding atmosphere, independently of its operation in response to excessive current. This is because such heating has the same effect in raising the temperatures of both loops 7A and 9A as does the divided current $b$ when excessive. Thus this form of the invention is operative in response to current-induced heating and ambient heating. Manual reclosure operation is also possible, as disclosed in connection with the description of FIGS. 1–4.

FIGS. 7 and 8 illustrate a modification of the FIGS. 5, 6 form of the invention, in which the only change is that the abutment line has been moved to the right to location $R_2$. In this FIG. 7 the plate, numbered 1B, is shown alone because the parts to which it is connected are all the same as in FIG. 5. The parts composing the plate have the same numbers as in FIGS. 5 and 6, except that they substitute the letter B for the letter A. The current path through this plate is also like that shown in FIG. 5, being in this case lettered $c$. In the FIGS. 7 and 8 form of the invention, the abutment line $R_2$ passes through the leg 11B and a side of the loop 7B, rather than through the center of the loop, as in FIG. 5. The effect of so moving the line $R_2$ is to adjust the contact-closing force introduced by the inverted arrangement of high- and low-coefficient components 57B and 59B to the right of line R$_2$. Which of the two forms shown in FIGS. 5, 6 or FIGS. 7, 8 may be employed depends upon particular requirements. It will be understood that this form of the invention, like that of FIGS. 5 and 6, operates also in response to heating from the ambient atmosphere which, like the divided current $c$, raises the temperature of both loops 7 and 9, wherein respectively are inverse arrangements of materials of high and low coefficients of thermal expansion.

Another form of the invention is shown in FIGS. 9–11. In this form, like numerals designate like parts, except in connection with modified parts, as to which letters C have been used. As regards the metal base, it is lettered 34C and integrally includes the line terminal 33C. The integral conductive arrangement 34C, 33C is flanked by an insulating ridge 38C, next to which is a third conductive base part 36C, riveted to the insulating support 25 by rivets 40C. The part 36C constitutes a third terminal on which a tab 37C is provided for making a circuit connection. The part 34C carries the rivets 30 and 21 for supporting plate 1C.

Another difference in the FIGS. 9–12 form of the invention is that the abutment dividing line indicated at R$_3$ is anguuarly extended, so that on the one hand it traverses the arm 39C substantially at right angles to its length. It also right-angularly traverses the connection 11C on the right-hand side of the first loop 7C. The material of the plate 1C to the left and above line R$_3$ is bimetallic, with its upper bimetallic component 61C being of the lower coefficient of expansion and the lower component 63C being of higher coefficient of expansion. This is indicated in FIGS. 10 and 11. The material of the plate 1C to the right and below the line R$_3$ is monometallic, such as stainless steel or a beryllium copper alloy, as indicated at 65C in FIGS. 10 and 11. When the plate 1C is cool, the contact 41C is up against contact 43, and current flows as shown by the broken lines $d$. Upon heating in response to overload current, the initially downwardly warped loop 7C deflects upward, resulting in downward snap action of the contact 41C into engagement with the base 36C, thus directing the current to line terminal 37C instead of over terminal 47, as theretofore. This form of the invention, like the FIGS. 5–8 forms, is also operative in response to such equal temperature changes in both loops 7C and 9C as may be induced by ambient heating. FIG. 12 shows a modification like that in FIGS. 9–11 but in which, instead of a butt joint such as 4 in FIG. 11 being employed along the connection R$_3$, there is employed a welded lap joint as shown at 6 in FIG. 12.

An advantage of the FIGS. 9–12 form of the invention is that a relatively small amount of all of the current adapted to be controlled is employed for heating loop 7C. Any heating of loop 9C, either by current, or ambiently, does not substantially modify the snap action for which the heating of loop 7C, being thermostatic, is primarily responsible.

In FIG. 13 is shown a form of the invention that is exactly the same as the form shown in FIG. 9, except that the insulating divider strip 38C has been omitted. The common notation for the resulting conductive base plate is 69 in FIG. 13. All other parts that are the same as those already described in connection with FIG. 9 have been given like numerals. In this case the dividing line R$_3$ is located the same as in FIG. 9 and the composite nature of the plate 1C may be the same as that shown either in FIG. 11 or 12. Thus this form of the invention differs from the form shown in FIG. 9 only in the fact that provision for the third terminal 37C has been omitted. Current flow will be as indicated at $e$. It is operative in response to current-induced temperature changes in loop 7C and in response to temperature changes induced therein by ambient heating.

While equal thicknesses of high- and low-coefficient components are shown, it will be understood that these may vary. In any event, resistance varies in the plate 1, 1A, 1B or 1C, as the case may be, according to the distribution of the conductive metals crosswise of the current paths. This results in many possible variations in regard to local heating characteristics throughout the plate, as determined by the position of parting line R$_1$, R$_2$, R$_3$, as the case may be. Thermostatic action in response to changes in temperature caused by ambient heating without current flow is also changed by any change in position of the abutment line, for the reason that variation in position of this line throws various masses of the components of high and low coefficients of expansion throughout different areas within the outline of the plate, thus causing different operating characteristics.

In all forms of the invention the plate 1, 1A, 1B, 1C, as the case may be, is relatively thin, having a high ratio of width to thickness throughout, for example, 25:1. The reason for the loops such as 7, 7A, 7B, 7C and 9A, 9B, 9C being narrower in width than adjacent parts is to concentrate temperature rises in these regions in response to flow of excess current.

It is to be understood that the mechanical operating elements 51, 53, 55 shown in the FIGS. 1–4 form are dispensible in the case of some electrical systems. Such a mechanical system may also be applied to or dispensed with in the forms of the invention shown in FIGS. 5–13. It is also to be understood that various metals of high and low thermal expansion coefficients may be used to make up the plate components.

Regarding the broad aspects of the invention, the thermostatic device consists of a flexible composite thermostatic plate such as, for example, 1 or the like, having bonded elements such as (1, 3), (57A, 59A), (61A, 63A), 65C or the like of different coefficients of thermal expansion. This plate has a plane outline consisting of oppositely turned sections such as loops (7, 9) or the like, these sections having a connecting join such as 11 or the like. Supports such as (21, 30) or the like for the unjoined ends of the turned sections are adapted to tension the plate generally along its plane and crosswise of the extent of said join, to warp the plate in one manner transversely of the plane, whereby in response to temperature change the plate will spontaneously move with snap action to another warped condition in a reverse manner relative to said plane. It will also be seen that the bonded elements consist of sheets of material of different coefficients of expansion which in some cases are related in one order throughout the entire area of the plate. In other cases, one order occurs throughout a part of the area of the plate and in a reverse order throughout the remainder of the area of the plate. In the third case, the elements extend in one order throughout a part of the area of the plate, the remaining area of the plate being composed of a single sheet.

It will be appreciated that the thermostatic device of the invention may be used for purposes other than operating switch contacts from the arm 39, 39A, 39B, 39C, such as, for example, an indicator, valve or the like. In such event the temperature of the device may be effected either by current application or application of heat from the surrounding atmosphere.

Reference has been made above to the S-shape of the plate. This definition of the shape is intended to include all similar forms having opposed concavely shaped parts joined by a common part on the opposite sides of which are the concavities thereof. This includes Z-shapes and the like.

In view of the above, it will be seen that the several objects of the invention are achieved and other advantageous results attained.

As various changes could be made in the above constructions without departing from the scope of the inven-

I claim:

1. A thermostatic device comprising a composite flexible thermostatic plate having bonded layers at least one of which is electrically conductive, said plate being of general S-shape comprising a first loop and an opposed second loop joined by a common intermediate leg, the first loop and the second loop terminating in endwise first and second legs respectively, a first arm extending at an angle from said first leg, a second arm extending from the second loop and in the general direction of said first arm, a movable contact on one face of said second arm and means supporting a fixed contact on that side of the plate corresponding to said face, said fixed contact being positioned to be engaged and disengaged by said movable contact, spaced supporting means for said first arm and an end portion of said second leg adapted to apply warping force to the plate generally along its plane and transversely to the length of the intermediate leg thereby to bias said movable contact against said fixed contact when the plate is comparatively cool, the layers of said plate in at least some parts of said first loop and the first and second arms being composed of materials having relatively high and low thermal coefficients of expansion respectively, the layer of low coefficient being on the side of the plate corresponding to the side on which said movable and fixed contacts are located, and means adapted to supply current to the plate in series through said first arm, the first loop, the intermediate leg and the second arm.

2. A thermostatic device according to claim 1, wherein said layers extend continuously throughout both loops, the intermediate leg and the second leg, with the layer of low coefficient on said side of the plate, and including means adapted to restrict flow of current to said first and second arms, the first loop and the intermediate leg.

3. A thermostatic device according to claim 1, wherein all layers are conductive and wherein the second leg, the second loop and at least portions of the first loop and of the intermediate leg are constituted by layers of reversely ordered high and low thermal coefficients of expansion, and including means adapted to direct an additional flow of current through the second leg and second loop in electrical parallel to the flow of current through the first arm, the first leg, the first loop and the intermediate leg.

4. A thermostatic device according to claim 3, wherein the line of demarcation of reversely ordered layers is such that all parts of the layers in all of the intermediate legs are in the inverse order.

5. A thermostatic device according to claim 3, wherein the line of demarcation of reversely ordered layers passes through and divides the intermediate leg.

6. A thermostatic device according to claim 1, wherein the second leg, second loop and the intermediate leg are composed of a single layer of conductive material, and including means adapted to supply additional current flow through the second leg and second loop in parallel to the flow of current through the first arm, the first loop and the intermediate leg.

References Cited in the file of this patent

UNITED STATES PATENTS

| | | |
|---|---|---|
| 2,336,408 | Matthews | Dec. 7, 1943 |
| 2,338,474 | Wilson | Jan. 4, 1944 |
| 2,630,504 | Burch et al. | Mar. 3, 1953 |
| 2,777,032 | Burch | Jan. 8, 1957 |
| 2,825,785 | Taylor | Mar. 4, 1958 |
| 2,899,512 | Burch | Aug. 11, 1959 |

UNITED STATES PATENT OFFICE
CERTIFICATE OF CORRECTION

Patent No. 3,023,287                                February 27, 1962

Henry David Epstein

It is hereby certified that error appears in the above numbered patent requiring correction and that the said Letters Patent should read as corrected below.

Column 2, line 48, for "17. This at normal" read -- 17, at normal --; column 8, line 16, for "legs" read -- leg --.

Signed and sealed this 26th day of June 1962.

(SEAL)
Attest:

ERNEST W. SWIDER
Attesting Officer

DAVID L. LADD
Commissioner of Patents